US012776204B2

(12) United States Patent
Large

(10) Patent No.: US 12,776,204 B2
(45) Date of Patent: Oct. 27, 2026

(54) MONITORING TRAFFIC

(71) Applicant: VIAVI SOLUTIONS INC., Chandler, AZ (US)

(72) Inventor: Stuart Large, Church Crookham (GB)

(73) Assignee: VIAVI SOLUTIONS INC., Chandler, AZ (US)

(*) Notice: Subject to any disclaimer, the term of this patent is extended or adjusted under 35 U.S.C. 154(b) by 185 days.

(21) Appl. No.: 18/713,128

(22) PCT Filed: Nov. 16, 2022

(86) PCT No.: PCT/GB2022/052902
§ 371 (c)(1),
(2) Date: May 23, 2024

(87) PCT Pub. No.: WO2023/094796
PCT Pub. Date: Jun. 1, 2023

(65) Prior Publication Data

US 2025/0095481 A1 Mar. 20, 2025

(30) Foreign Application Priority Data

Nov. 26, 2021 (GB) ...................................... 2117090

(51) Int. Cl.
*G08G 1/00* (2006.01)
*G08G 1/01* (2006.01)
(Continued)

(52) U.S. Cl.
CPC ......... *G08G 1/0133* (2013.01); *G08G 1/0112* (2013.01); *G08G 1/0145* (2013.01); (Continued)

(58) Field of Classification Search
CPC .. G08G 1/0133; G08G 1/0112; G08G 1/0145; G08G 1/015; G08G 1/04;
(Continued)

(56) References Cited

U.S. PATENT DOCUMENTS

2016/0078760 A1* 3/2016 Crickmore ........... G08G 1/0116 701/117
2021/0241615 A1* 8/2021 Narisetty ............. G08G 1/0141
(Continued)

FOREIGN PATENT DOCUMENTS

WO 2021123453 A1 6/2021
WO 2021152648 A1 8/2021

OTHER PUBLICATIONS

International Search Report for Application No. PCT/GB2022/052902, mailed Feb. 13, 2023, 3pages.

*Primary Examiner* — Shardul D Patel
(74) *Attorney, Agent, or Firm* — Mannava & Kang, P.C.

(57) ABSTRACT

A method of estimating one or more properties of traffic of vehicles passing along roadway segments of a road network includes receiving, from a radio navigation receiver located at each vehicle of a subset of the vehicles, first properties of each of those vehicles, and receiving, from a distributed acoustic sensor, signals representing acoustic vibration caused by the traffic at sensing optical fibers that extend along the roadway segments to determine second properties of the traffic in the road network. The method further includes combining the first properties received from each vehicle in the subset of vehicles with the second properties of the traffic to estimate third properties of the traffic that are used to provide navigation services in the road network.

14 Claims, 6 Drawing Sheets

(51) Int. Cl.

| | |
|---|---|
| ***G08G 1/015*** | (2006.01) |
| ***G08G 1/04*** | (2006.01) |
| ***G08G 1/052*** | (2006.01) |
| ***G08G 1/056*** | (2006.01) |

(52) U.S. Cl.
CPC ............... *G08G 1/015* (2013.01); *G08G 1/04* (2013.01); *G08G 1/052* (2013.01); *G08G 1/056* (2013.01)

(58) Field of Classification Search
CPC .......... G08G 1/052; G08G 1/056; G08G 1/02; G08G 1/065; G08G 1/00; G01C 21/3691; G01H 17/00; G01H 9/004
USPC ........................................................... 701/118
See application file for complete search history.

(56) References Cited

U.S. PATENT DOCUMENTS

2021/0318164 A1* 10/2021 Ozharar ................... G08G 1/02
2022/0375338 A1* 11/2022 Narisetty ............... G06N 3/045
2023/0343209 A1* 10/2023 Ionescu ................ G08G 1/0141

* cited by examiner

MONITORING TRAFFIC

CLAIM FOR PRIORITY

The present application is a national stage filing under 35 U.S.C 371 of PCT application number PCT/GB2022/052902, having an international filing date of Nov. 16, 2022, which claims the benefit of priority to GB application 2117090.7 filed Nov. 26, 2021, the disclosures of which are hereby incorporated by reference in their entireties.

The present disclosure relates to methods and apparatus for sensing or monitoring traffic, and in particular for improving estimations of one or more properties of such traffic, such as traffic flow parameters or traffic queue properties.

INTRODUCTION

The sensing and monitoring of traffic and traffic conditions is carried out in a variety of ways in the prior art, for example using inductive loops buried in road surfaces, radar based detectors, and video cameras. However, these sensors tend to detect the passing of vehicles at either a single point or along a rather limited stretch of roadway, which makes the detection and monitoring of more dynamic and extended traffic features such as traffic queues challenging.

Some prior art arrangements use positional data (which may include velocity data and similar) from radio navigation receivers such as mobile telephones or other user devices with GPS or other satellite navigation capability, in populations of vehicles, in order to provide an overview of traffic conditions in a road network. From this overview more detailed calculations can be made such as estimated journey times and optimized routes which can be passed back to the user devices for navigation guidance.

However, transmission of this positional data from many user devices, principally over cellular networks, is expensive in terms of network resources and consumes considerable power in the user devices, so that the positional data tends to be transmitted quite infrequently. As a consequence, there can be considerable lags between a change in the progress of particular vehicles which may indicate changes in traffic conditions or queues, and the recognition of these changes in the overview of traffic conditions.

The overview of traffic conditions can also be affected by various other factors which diminish its accuracy or increase its latency, for example;

- different user devices will be on different service provider networks, and function using different operating systems. The overview of traffic conditions is very unlikely to be able to make use of all user device types, service providers and operating systems, so that the proportion of vehicles which contribute to the overview of traffic conditions may vary considerably, and sometimes may be quite small;
- positional data from user devices may be most accurate where Wi-Fi access points are visible to the user devices, so in particular in urban or built up areas. In rural areas, for example along trunk routes, little or no Wi-Fi is available to improve positional data accuracy;
- in urban areas with tall buildings, or where there is significant tree cover, satellite navigation capability can be disrupted through lack of satellite signals, and more particularly at higher latitudes where satellites will tend to be at lower elevations/It would be desirable to address problems and limitations of the related prior art.

SUMMARY OF THE INVENTION

The inventors have observed that distributed acoustic sensing techniques can provide good quality tracking of vehicle movements within a road network over space and time, with spatial resolutions of around a meter or so, and time resolutions of the order of a second or less. Vehicle and traffic velocities, flow rates, and queues can therefore be identified and monitored with good accuracy. However, since distributed acoustic sensing relies on the presence of suitable sensing optical fibres running along roadways, the degree of coverage of a road network is likely to be quite small. Furthermore, although the tracks of individual vehicles can be followed for discrete periods, at many points tracks of individual vehicles fade or become indistinguishable from other vehicles, for example in queues, at junctions, and sometimes between traffic lanes, and this can make determination of traffic effects on particular vehicles or in respect of particular routes difficult to determine.

The invention therefore provides methods and apparatus which combine vehicle or traffic data received from radio navigation receivers of particular vehicles with vehicle or traffic data determined from acoustic signals gathered using distributed acoustic sensing techniques. The radio navigation data is able to provide a general view over a whole city or road network, whereas the distributed acoustic sensing data can provide more detailed data in particular areas, or calibration or compensation of the radio navigation data.

For example, if positional data is received from certain number of radio navigation receivers in vehicles moving along a section of road, distributed acoustic sensing can then provide a more precise count of the vehicles travelling on that section of road and therefore inform from what proportion of the vehicles the positional data is being received. Knowledge of this proportion then also allows estimation of the total number of vehicles travelling on other nearby roads for which distributed acoustic sensing data is not available.

Similarly, positional data from radio navigation receivers across the road network can be used to calculate estimated journey times and provide optimised routes across the network, but the distributed acoustic sensing data can be used to give more granular detail of where there might be congestion at any given moment, and provide more rapid updates as traffic conditions change on the planned route. By combining data from both the radio navigation receivers and the distributed acoustic sensing, more highly optimized routes can be determined and provided to drivers, for example avoiding traffic queues that systems using the radio navigation receiver data alone currently miss or can't anticipate.

The combination of lower time and/or spatial resolution positional data from radio navigation receivers with higher time and/or spatial resolution traffic data from distributed acoustic sensing, also permits the generation of more detailed information about driver behaviour, and can be used to identify sections of road that are more dangerous and need special safety measures, or to coach drivers to drive more efficiently and reduce fuel consumption, emissions and costs.

In some sections of a road network where vehicles and traffic are adequately monitored by means of distributed acoustic sensing, it may be practical to avoid transmission of data from radio navigation receivers altogether and instead rely for traffic monitoring on the distributed acoustic sensing, thereby saving on device and network resources, including data transmission and device battery power.

To this end, the invention provides a method of estimating one or more properties of traffic passing along roadway segments of a road network, the traffic comprising a plurality of vehicles, the method comprising:

receiving, from a radio navigation receiver (such as a GPS receiver) located at or in each vehicle of a subset of said vehicles, one or more first properties of each of the vehicles in the subset of vehicles; and using distributed acoustic sensing to generate, as a function of time and of position along a subset of the segments of the road network, signals representing acoustic vibration, or vibration, or noise, or disturbances, caused by said traffic at one or more sensing optical fibres that extend along the subset of segments.

The roadway segments may be defined by portions of whole roadways, portions of lanes of roadways, may include junctions or portions of junctions and so forth. Typically, whereas vehicles in the subset of vehicles may be found nearly anywhere in the monitored road network, the subset of segments of the road network monitored using distributed acoustic sensing might typically make up just a few percent to a few tens of percent of the road network, for example less than 50% of the road network. The subset of vehicles may then, for example, comprise vehicles of which no more than 20%, 50% or 80% are found within or expected to be within the subset of segments at any one time. The road network may typically comprise several kilometres to several hundred kilometres or more of roadways or road segments, for example at least ten or at least a hundred kilometres of roadway segments. The number of vehicles expected to be on the roadway network at any one time might be in the range of hundreds to thousands or more vehicles.

The invention then provides: using the signals representing acoustic vibration caused by said traffic to determine one or more second properties of said traffic in the subset of segments; and combining the received first properties of the vehicles in the subset of vehicles with the determined second properties of the traffic in the subset of segments, to estimate one or more third properties of the traffic.

The one or more first properties of each of the vehicles in the subset of vehicles may comprise one or more of: positions of said vehicles; positions of said vehicles to a spatial precision of no better than 5 metres or no better than 10 metres; directions of travel of said vehicles; and velocities or speeds of said vehicles. The one or more first properties of each of the vehicles in the subset of vehicles may be sent from each vehicle or receiver at relatively widely spaced time intervals, for example not more frequently than every 10 or every 30 seconds. Similarly, the received one or more first properties of each of the vehicles in the subset of vehicles, may represent said first properties at spaced intervals which are at least 10 seconds or at least 30 seconds apart.

The one or more second properties of the traffic in the subset of segments may comprise one or more of: a count or density of vehicles in the traffic; and a flow rate or velocity of the traffic; positions of particular vehicles; positions of particular vehicles to a spatial precision of better than 10 metres or of better than 5 metres; velocities of particular vehicles; and categories of particular vehicles for example in terms of vehicle size or type.

The one or more second properties of the traffic in the subset of segments may also or instead comprise one or more properties of queues of said traffic, such as the presence of a queue, the spatial positions of front and/or back boundaries of a queue, the spatial length of a queue, and the time expected for a vehicle to remain in the queue.

Due to the nature of the distributed acoustic sensing, which can provide a data stream with high time resolution, the one or more second properties of said traffic in the subset of segments may be determined more frequently than every 10 seconds or every 1 second.

The one or more third properties of the traffic may comprise one or more of: an estimate of a proportion of the vehicles of the traffic within one or more particular segments of the segments subset, that are also within the vehicles subset; an estimate of the proportion of the vehicles of the vehicles subset, within one or more particular segments, that fall into each of two or more different categories or sizes of vehicles; and an estimate of the proportion of vehicles in each of two or more different categories, within one or more particular segments, that are found in the vehicles subset.

The one or more third properties of the traffic may be estimated from the one or more first properties, with the estimation being compensated using an estimate of a proportion of the vehicles of the traffic (for example within one or more particular segments of the segments subset), that are also within the vehicles subset. In this way, the distributed acoustic sensing which senses all vehicles in a segment which provide a sufficient and distinct acoustic signal, can be used to compensate for first properties being received from only a subset of vehicles.

The one or more third properties of the traffic may comprise for example one or more of: a count, density, flow rate or velocity of the traffic within one or more segments of the segments subset; a count, density, flow rate or velocity of the traffic in one or more segments outside the segments subset; an estimated journey time across the road network; an optimised vehicle route across the road network; and routes of particular vehicles.

The methods may comprise estimating said third properties of the traffic at a higher temporal and/or a higher spatial resolution than the corresponding temporal and/or spatial resolutions of the first properties, in particular by using said first properties where those first properties have such a higher temporal and/or spatial resolution. For example, by using the second properties, the one or more third properties of the traffic may define a particular lane of a roadway within which a particular vehicle is travelling, rather than just more broadly defining the roadway as a whole, or may provide a more accurate estimate of which lane of a roadway a vehicle is travelling in.

The method may then further comprise providing route guidance to a driver of a vehicle based on the one or more third properties of the traffic estimated at a higher temporal and/or a higher spatial resolution than the corresponding temporal and/or spatial resolutions of the first properties.

The one or more third properties of the traffic may comprise one or more of: extended tracks of particular vehicles within the subset of segments; and extended tracks of particular vehicles which traverse segments both within and outside of the subset of segments. For example, each extended track for a particular vehicle may comprise multiple track segments determined using the second properties, which are known to be associated to form an extended track of the particular vehicle by using the first properties.

The invention also provides apparatus corresponding to the above methods, for example apparatus for estimating one or more properties of traffic passing along segments of a road network, the traffic comprising a plurality of vehicles. The apparatus may be or may comprise a traffic monitor or other apparatus arranged to receive, originating from a radio navigation receiver located at each vehicle of a subset of said vehicles, one or more first properties of each of the vehicles in the subset of vehicles, the traffic monitor also being arranged to receive and use distributed acoustic sensor signals representing acoustic vibration caused by said traffic in a subset of segments of the road network to determine one or more second properties of said traffic, and to combine the received first properties of the vehicles in the subset of vehicles with the determined second properties of the traffic in the subset of segments, to estimate one or more third properties of the traffic.

The apparatus may also comprise one or more such distributed acoustic sensors arranged to provide such distributed acoustic sensor signals, the distributed acoustic sensors comprising one or more sensing optical fibres that extend along the subset of the segments of the road network, the distributed acoustic sensors being arranged to generate, as a function of time and of position along the subset of segments, signals representing acoustic vibration caused by said traffic.

The apparatus may also comprise a traffic signal control system arranged to provide control signals to traffic using, or based at least in part, on the estimated one or more third properties, and/or a satellite navigation service 28 arranged to provide navigation data and/or services to one or more vehicles within the road network using, or based at least in part, on the estimated one or more third properties.

Where method or apparatus aspects are described which require data processing, this may be carried out by one or more suitable computer systems, and such computer systems may be located or distributed in various ways and not necessarily proximal to other aspects of the method or apparatus. To this end, the invention also provides one or more computer readable media comprising computer program code arranged to carry out any of the methods described herein, and in particular aspects of those methods carried out by the traffic monitor discussed below, and components of the traffic monitor together or individually.

Such computer program code may be executed on one or more suitable computer processors or computer systems. Generally also, the described methods may be implemented automatically, and without human intervention, using suitable control and/or computer systems.

BRIEF SUMMARY OF THE DRAWINGS

Embodiments of the invention will now be described, by way of example only, with reference to the accompanying drawings of which.

DETAILED DESCRIPTION OF EMBODIMENTS

Figure 1:
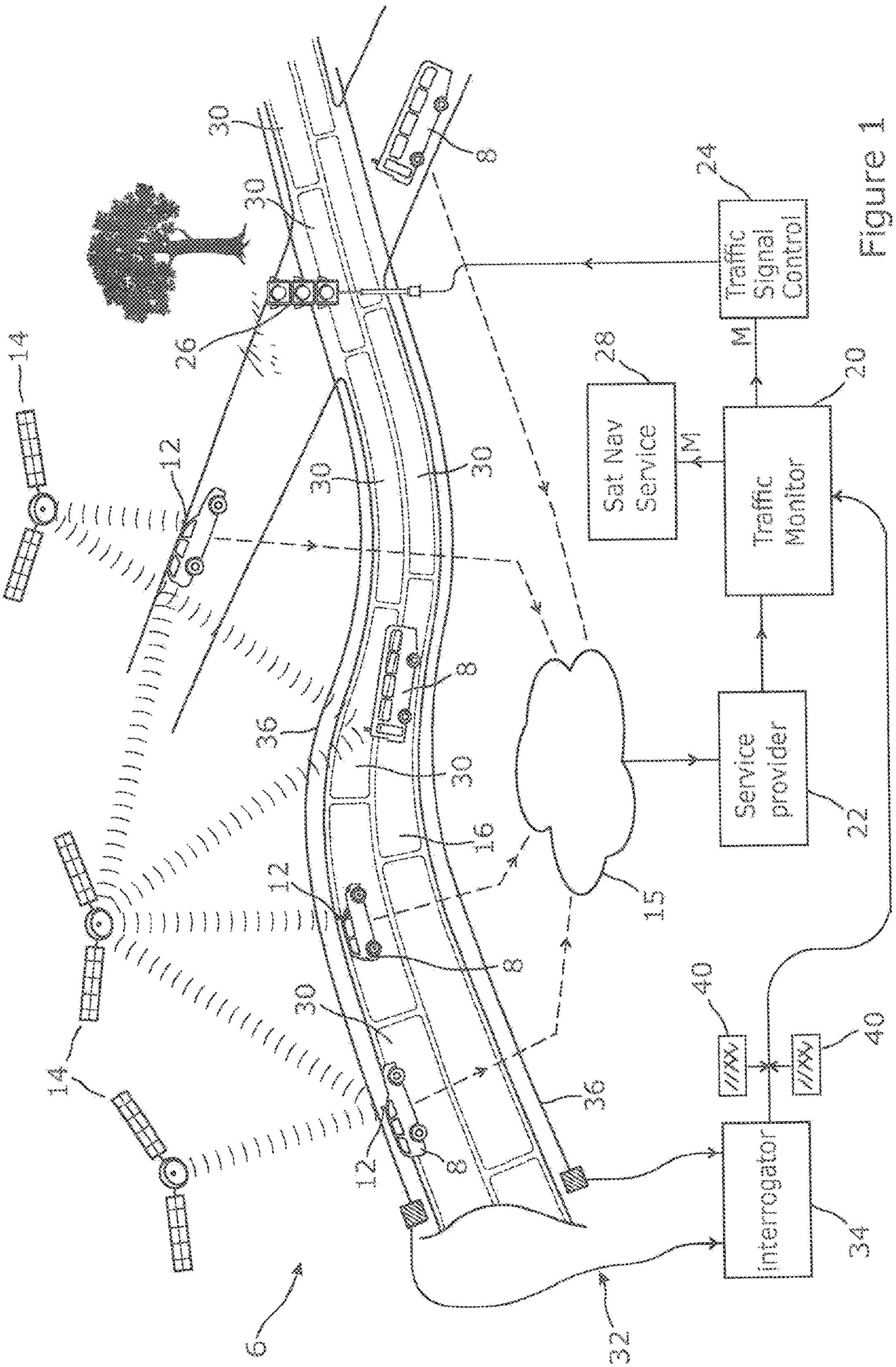
FIG. 1 schematically illustrates a road traffic monitoring system which both receives traffic or vehicle data, as first properties, from radio navigation receivers within individual vehicles, and receives traffic or vehicle data, as second properties, from distributed acoustic sensors.

Referring to FIG. 1 there is illustrated a road traffic monitoring system 6 arranged to monitor road traffic which comprises a plurality of vehicles 8 driving within a road network. The road network comprises a number of roadways 10, where the roadways 10 also include junction portions to connect to others of the roadways.

At least some of the vehicles 8 carry a radio navigation receiver 12, which may typically be a receiver operating within a satellite navigation systems such as the Global Positioning System GPS, the Galileo system, or the GLONASS system, receiving radio navigation signals from satellites 14. However, the radio navigation receivers 12 may also or instead use other navigation signals such as radio signals from ground based beacons, use dead reckoning techniques, and so forth. Some or all of the radio navigation receivers 12 may be implemented as mobile telephones or other mobile computing devices comprising radio navigation receiver functionality, or as dedicated hardware and/or software implemented as part of some or all of the vehicles 8.

Each radio navigation receiver 12 determines one or more first properties of the vehicle 8, such as position of the vehicle, velocity of the vehicle, and so forth, and these first properties are forwarded from the associated vehicle for receipt by a traffic monitor 20 typically implemented as part of a remote computer system. The first properties may typically be forwarded from the vehicles 8 through one or more cellular telephone networks or other data networks 15 to one or more service provider systems 22 which then forward the first properties on to the traffic monitor 20, for example under a commercial arrangement between the service provider(s) and an operator of the traffic monitor 20.

Notably, in the traffic monitoring system 6 of FIG. 1, the first properties are not received at the traffic monitor 20 from all of the plurality of vehicles 8, but instead only from a subset of the vehicles. This may be for a variety of reasons in combination. Some of the vehicles 8 may carry no radio navigation receiver 12 at all, and of those that do, it is unlikely that all will be arranged to forward the first properties to the service provider system 22 and/or that the service provider system 22 will forward first properties from all the vehicles from which it receives such properties to the traffic monitor 20. For example, some vehicles 8 may contain mobile computing devices for which transmission of the first properties to the service provider system 22 has been turned off, and service provider system 22 may receive such properties only from mobile computing devices executing particular operating systems (for example Android operating systems) or particular software (for example Google Maps). Note that the membership of the subset of vehicles will change over time, in that vehicles will join and leave the subset for a variety of reasons.

Although the radio navigation receivers 12 located at each vehicle of the subset of vehicles may operate continuously, typically some or all of the first properties may be transmitted by such radio navigation receivers, or at least may be received by the traffic monitor 20, on a more intermittent basis. This may be due to radio navigation receivers 12 reducing the number of transmissions of the first properties, for example to save on battery life and/or to reserve resources for other functions or because of poor network availability, and/or due to the service provider system 22 reducing the frequency with which such first properties are passed on to the traffic monitor for commercial, practical, or privacy reasons. Typically, for example, the first properties from any particular vehicle 8 of the subset of vehicles may be sent by the vehicle or receiver, and/or received at the traffic monitor 20, no more than, or on average no more than, every 10 seconds, or every 30 seconds.

The first properties typically comprise one or more properties of interest to the traffic monitor 20 for purposes described below, but may typically comprise one or more of a spatial position of the radio navigation receiver or vehicle (typically as two or three dimensional coordinates on the Earth' surface), a direction of travel, and a speed or velocity of movement relative to the Earth's surface. Due to constraints on the precision of radio navigation receivers, especially such receivers operating in a non-military mode, the spatial position if reported as one of the first properties may be a spatial position with a precision of no better than 5 metres, or no better than 10 metres.

For the purposes of discussion, the road network may be conceptually divided up into a number of discrete segments 30. A segment of the roadway may for example comprise a discrete length of all lanes, of a subset of lanes, or of just one lane, of a particular roadway, a portion of the whole of a junction between roadways, and so forth. Properties of traffic data may then be determined where appropriate for particular segments of the road network. The actual segmentation may be different for different properties, and/or for different times, modes of measurement, and so forth.

In addition to being able to receive the first properties from radio navigation receivers in vehicles 8, the traffic monitoring system 6 comprises one or more distributed acoustic sensors 32, each of which typically comprises an interrogator 34 and one or more sensing optical fibres 36 which are coupled to the interrogator 34. The sensing optical fibres 36 are disposed along particular segments 30 of the roadways 10, and may be provided by existing telecommunications optical fibres, optical fibre installed expressly for the purposes of distributed acoustic sensing, and so on. The distributed acoustic sensors 32 are thereby arranged to generate, as a function of time and position, signals 40 representing acoustic vibration caused by traffic vehicles 8 passing along these roadway segments. However, not all segments of the road network are served, and listened to, by a distributed acoustic sensor 32 and associated sensing optical fibre. The distributed acoustic sensors 32 thereby only generate signals 40 representing acoustic vibration caused by traffic passing along a subset of the roadway segments, referred to herein as the subset of segments. For example, in the region of 5%-30% of a road network being monitored by the system might typically fall into the subset of roadway segments.

The acoustic vibration signals 40 are passed to the traffic monitor 20 which uses the signals to determine one or more second properties, which are properties of the traffic in the segments which belong to the subset of segments that are monitored by the distributed acoustic sensors 32. These second properties and then combined with the first properties received from the radio navigation receivers 12 to estimate one or more third properties, as discussed in more detail below. The third properties may be output as shown in FIG. 1 as data M for use by other systems, or may be further used by the traffic monitor 20 itself in various ways.

In FIG. 1 the third properties M are passed to a traffic signal control system 24 which is arranged to provide control of the traffic in the road network through a plurality of traffic control signals 26 or in other ways. Such control may include control of speed limit signs and speed warnings, traffic junction access control including traffic lights, hazard and traffic condition warning signs and so forth. Increasingly, some of these traffic control aspects may be built into computer and display systems within the vehicles themselves, so that control signals from the traffic signal control system 24 may be provided directly to vehicles as well as or instead of to suitable road signage.

Third properties M could also or instead be provided to one or more satellite navigation or other road navigation services 28 which provide navigation data such as traffic condition updates, estimated journey times, optimized routes, and similar data to vehicles 8 carrying suitable navigation systems or navigation software, which could for example be implemented on mobile user devices which also provide the radio navigation receiver data to the traffic monitor 20.

Note that the first properties discussed above are received from the subset of vehicles, but that the vehicles of this subset may be arbitrarily on any segment of the road network. In contrast, the second properties are determined for traffic of only a particular subset of segments of the road network, namely those for which the distributed acoustic sensors generate a signal representing acoustic vibration. Consequently, at any particular time, the first properties are likely to be representative of only a portion of the vehicles in any particular road segment, but representative of roadway segments across the whole road network, whereas the second properties are likely to be representative of most or all vehicles or traffic but only within the particular road segments being acoustically monitored.

The sensing optical fibres 36 may be disposed in various ways so as to enable the distributed acoustic sensors 32 to generate signals representing acoustic vibration caused by traffic passing along the subset of roadway segments. For example, such sensing optical fibres may be one or more of: buried within or affixed to the roadway surface, buried or otherwise disposed alongside the roadway, carried in a duct or conduit proximally to or above or beneath or alongside roadway segments, along or within a wall or tunnel or cutting through which the roadway passes, or bridge or similar elevated structure carrying the roadway, affixed to or within a roadway barrier, and/or in other ways. Sensing optical fibres may also be disposed across roadway segments, for example to help detect traffic properties which are specific to each of two or more different road lanes.

In each situation, the one or more sensing optical fibres 36 should be arranged so as to be sufficiently exposed to acoustic vibrations generated by vehicles passing along the particular roadway segment for those vehicles to be detected as described below. This may be achieved by ensuring that the sensing optical fibres are acoustically coupled to the material of the roadway so that acoustic vibrations generated by vehicles passing along the roadway are transmitted through the roadway into the material of the optical fibres for sensing.

In some arrangements the distributed acoustic sensors 32 may be able to readily distinguish between, or be sensitive only to, traffic in one or more particular lanes of a particular multi-lane roadway, for example using multiple sensing optical fibres disposed along each of multiple traffic lanes, and/or using sensing optical fibres disposed across or perpendicular to the direction of traffic flow.

The one or more second properties of the traffic determined for the subset of segments may comprise one or more bulk traffic oriented properties such as a count or density of vehicles in the traffic in each of one or more of the segments, a flow rate or velocity of the traffic in each of one or more of the segments, and other traffic stream parameters in corresponding locations.

The one or more second properties of the traffic in the subset of segments may also or instead comprise one or more properties of individual vehicles in such segments, such as positions, velocities, or classifications or categorisations of particular vehicles. Whereas the first properties received from the radio navigation receivers 12 may include positions of limited accuracy, for example to no better than 5 metres or to no better than 10 metres, the use of distributed acoustic sensing enables the second properties to be of a higher degree of spatial accuracy, for example determining spatial positions of particular vehicles with a spatial precision of better than 10, 5 or 2 metres.

Categories such as sizes of particular vehicles may be determined by various techniques such as detecting a volume or magnitude, or pattern or spectral content, of the acoustic vibration signal caused by a particular vehicle. A measure of size may then equate largely to axle weight, total weight, engine noise, or engine type of a particular vehicle. Such measures of size could for example be in the form of a number of discrete categories such as “heavy”, “medium” and “light”.

The one or more second properties of the traffic in the subset of segments may also or instead comprise one or more properties of queues of said traffic, for example the presence of such a queue, a spatial position of the back of a queue, a spatial position of the front of a queue, a spatial length of a queue, and the time expected to be taken by a vehicle to traverse the queue from the back to the front.

Advantageously, using distributed acoustic sensing, any of the one or more second properties of the traffic in the segments of the segment subset may be determined at high rates, for example more frequently (for each measurement or on average) than every 30 seconds, than every 10 seconds, or than every 1 second, and at various different degrees of spatial resolution within the segments.

Figure 2:
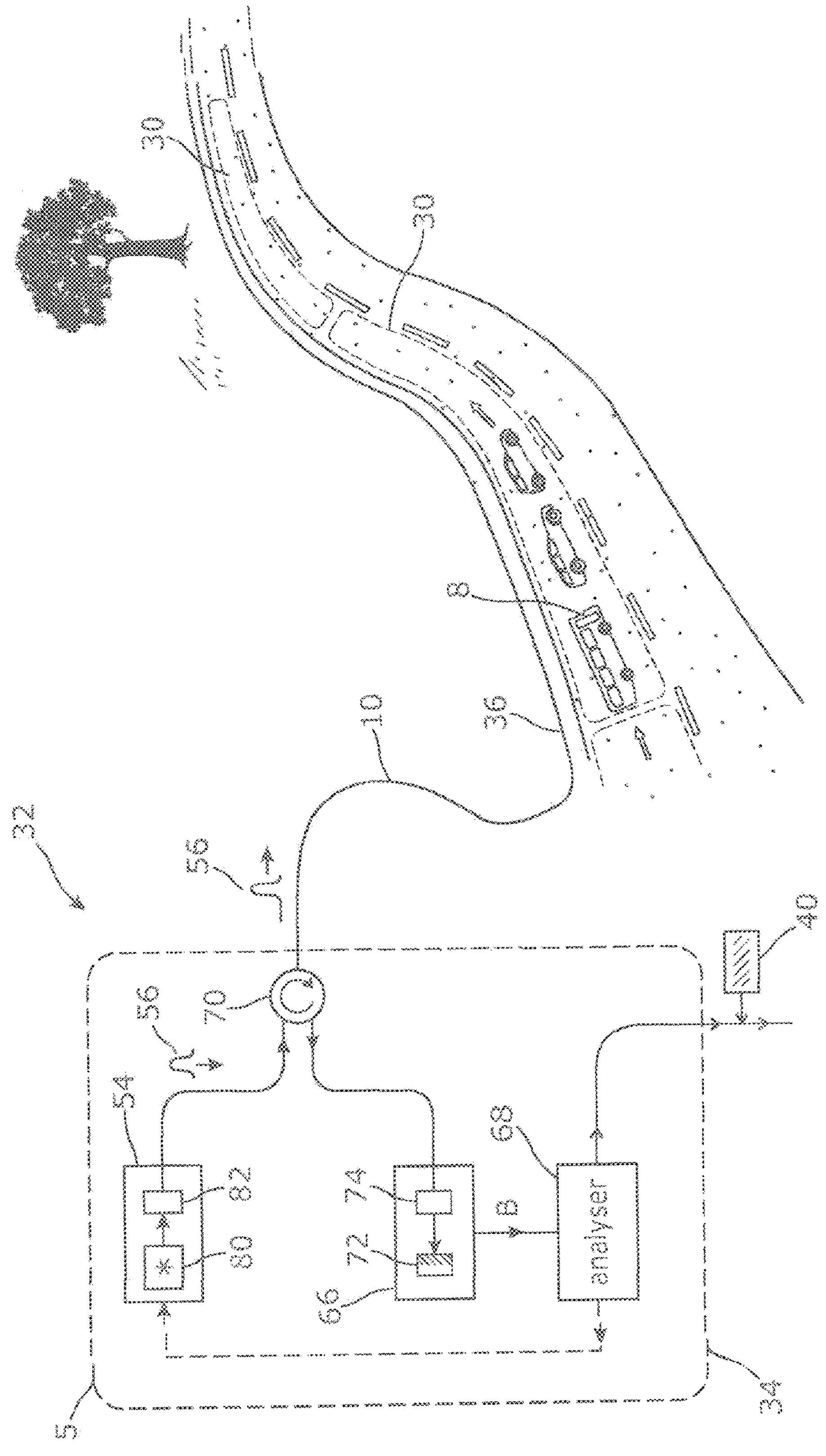
FIG. 2 shows in more detail how a distributed acoustic sensor of FIG. 1 may be implemented.

FIG. 2 illustrates in more detail how a distributed optical fibre sensor 32 of FIG. 1 may be arranged to generate signals 40 representing acoustic vibration caused by traffic at one or more sensing optical fibres 36 that extend along the subset of road segments 30 monitored by the distributed optical fibre sensors 32.

Some ways in which such distributed optical fibre sensors 32 may be used to generate such signals, and to interpret such signals to determine properties of the traffic are discussed in PCT/GB2020/053127 which is hereby incorporated by reference for these and all other purposes.

The distributed optical fibre sensor 32 is arranged to sense acoustic vibration as a function of position along the roadway segments 30, using optical time domain reflectometry, or another reflectometry technique, and in particular using a technique of distributed acoustic sensing. Acoustic vibration is sensed using one or more sensing optical fibres 36 which extend along the roadway.

In some embodiments, the one or more sensing optical fibres 36 may be disposed so as to be predominantly exposed to acoustic vibrations arising from either a single carriageway or from multiple carriageways which are carrying traffic in a single direction, so that analysis of acoustic signals arising from traffic along the roadway may be simplified or made more straightforward. In FIG. 2, for example, the sensing optical fibre 36 is disposed along the outside boundary of a two lane, two direction road, proximal to the left side carriageway from the perspective of the viewer, and is therefore predominantly sensitive to acoustic vibration arising from traffic moving along that left side carriageway, and is only marginally sensitive to traffic moving in the other direction along the right side carriageway. Another, different sensing optical fibre 36 could then be disposed along the other side of the road so as to be predominantly sensitive to traffic moving along the right side carriageway. Other optical fibres may be disposed across traffic lanes to provide improved detection of traffic properties in particular lanes.

The sensing of acoustic vibration may be achieved in embodiments of the invention using various techniques known in the prior art. Some such techniques are described for example in WO2016/012760, WO2017/125717, WO2019/224511, and WO2012/063066, each of which is hereby incorporated by reference for these and all other purposes.

In the particular arrangement of FIG. 2, the interrogator unit 34 of the sensor includes a probe light source 54 for generating probe light pulses 56 of suitable timings, shapes and wavelengths, an optical detector 66 for detecting probe light resulting from the probe light pulses being backscattered within the sensing optical fibre 36, and an analyser 68 for processing data representing properties of the backscattered and detected light which have been received at the optical detector 66. The probe light source 54 forms probe light pulses 56, each pulse having an optical wavelength, and contains one or more laser sources 80 to generate the probe light pulses 56. The probe light pulses may be conditioned in the probe light source by one or more source optical conditioning components 82. The probe light pulses are forwarded to an optical circulator 70 and from there on to the sensing optical fibre 36 which is disposed along the roadway segments 30 which are to be acoustically monitored for traffic.

Probe light which has been Rayleigh backscattered within the sensing optical fibre 36 is received at the circulator 70 which passes the collected light on to the optical detector 66, which comprises one or more optical detector elements 72. Such detector elements may comprise, for example, one or more suitable photodiodes. The backscattered light may be conditioned in the detector using one or more detector optical conditioning components 74. The detector 66 then passes a detected interference signal B corresponding to the detected backscattered probe light to the analyser 68.

The analyser 68 is arranged to process the detected interference signal B to generate and output a signal 40 representing acoustic vibration as a function of position and time along the sensing optical fibre 36, and therefore also as a function of position and time along the roadway segments 30. As discussed above, this signal 40 is received at the traffic monitor 20 of FIG. 1, which is arranged to use the signal to determine one or more second properties of the traffic (which may include properties of particular vehicles) in the roadway segments 30 of the subset of segments.

The distributed optical fibre sensor 32 may be operated using phase-sensitive optical time domain reflectometry (PS-OTDR) in which probe light pulses are used which are each sufficiently coherent that the detected backscatter signal contains or is dominated by self-interference between different parts of the same pulse. Such techniques which may be used in implementations of the present invention are described in WO2006/048647, WO2008/056143 and WO2012/063066 which are hereby incorporated by reference for this and all other purposes. The resulting coherent Rayleigh backscatter leads to a temporal speckle pattern of interference fringes at the detector, which leads to the detector outputting a coherent Rayleigh backscatter interference signal B. This signal from the detector then represents, for each probe light pulse, a time series of intensity of the detected coherent Rayleigh backscatter interference. Typical lengths of the probe light pulses may be about 50 ns, to provide a spatial resolution along the sensing optical fibre of about 5 metre, sufficient to detect the progress of separate moving vehicles, although other pulse lengths for example in the range 10 ns-200 ns could be used, giving spatial resolutions of about 1 to 20 metres.

In order to sense changes over time at a particular position along the sensing optical fibre 36, the temporal development of the interference signal, for a particular round trip time delay for travel of a probe light pulse which corresponds to that position, may be followed over a series of probe light pulses. The round trip time to the end and back to the detector for a 1000 metre long sensing fibre is about 10 microseconds, so that a pulse repeat rate of up to about 100 kHz can easily be used if required, although much lower pulse rates may be used, as long as the resulting detected acoustic signal contains sufficient frequency range to adequately detect the progress of vehicles moving along the roadway segments 30.

The form of the coherent Rayleigh backscatter or other interference signal B arising from a single probe light pulse arises partly from refractive index variations along the sensing optical fibre. Such refractive index variations will be partly due to inherent variations arising from manufacture and installation of the fibre. However, the refractive index at any particular location will also vary over time due to environmental effects, in particular local changes in strain imposed on the optical fibre by acoustic vibration coupled into the material of the fibre or into an associated mounting or cable structure. The acoustic signal 40 can then be derived from the interference signal by direct detection techniques such as comparison of the interference signal at a particular location from frame to frame (for example see U.S. Pat. No. 7,946,341), or by more direct measurement of interference phase change at each location for example by counting fringes. In some implementations, coherent detection techniques may be used, such as those described in Lu et al., Journal of Lightwave Technology, Vol. 28, 22, 2010, in which probe light backscattered within the sensing optical fibre 12 is mixed with light from a local oscillator (typically from the same laser source as that used to generate the light directed into the sensing optical fibre), and phase of the mixed light is measured to determine phase changes and therefore acoustic vibration at various locations along the fibre.

Figure 3:
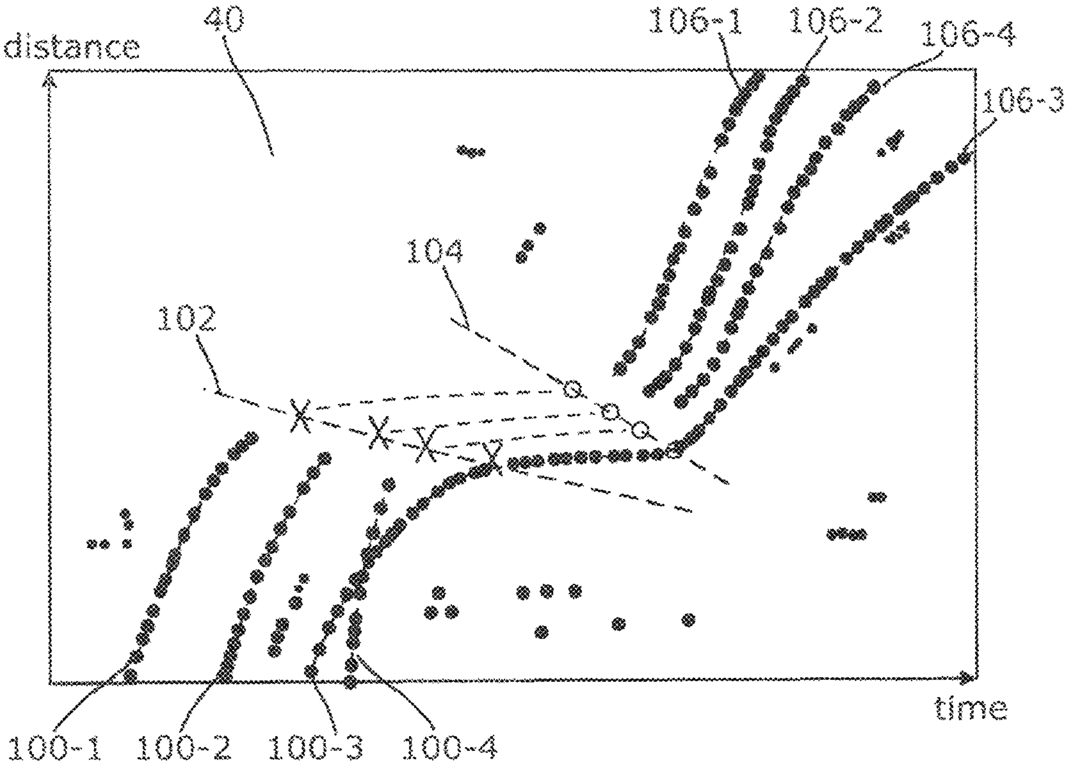
FIG. 3 illustrates acoustic signals received from a distributed acoustic sensors such as those of FIGS. 1 and 2, in particular showing vehicles approach the back and departing from the front of a traffic queue.

FIG. 3 provides a sketch of a section of a signal 40 representing acoustic vibration over a limited time and spatial range along one or more roadway segments. In particular, the illustrated section shows traffic arriving at the back of a traffic queue and departing from the front of the same queue. The axes of the graph are time along the abscissa, distance along the ordinate, and an intensity of the acoustic signal at a particular time and position is shown by the shading at that point. The intensity of the acoustic signal may be an overall intensity or measure of power over the full range of detected acoustic frequencies, or may result from processing in some way, for example with different frequency bands being weighted differently so as to contribute to the overall intensity to different degrees. In this way, the intensity of the acoustic signal can be calculated so as to maximise the visibility and usefulness of acoustic signals arriving from vehicles and to minimise spurious noise which may tend to confuse such vehicle signals.

A number of vehicle tracks, each corresponding to a particular vehicle progressing along the roadway segment 30, can be seen, with steeper tracks corresponding to faster vehicle speeds. For clarity, a rather limited number of vehicle tracks are shown, and many more may be apparent in practice, for example in situations of heavy and continuous traffic.

A series of vehicle tracks 100 to the lower left represent vehicles moving towards the back 102 of a queue of traffic, the estimated position of which is indicated by a broken diagonal line. Once beyond the back of the traffic queue, that is inside the queue, vehicles may be stationary or slow moving, or may oscillate between these states. While slow moving, the speeds of vehicles may be variable. The approximate presumed tracks of the vehicles within the queue are shown with broken lines.

As the vehicles move closer to the back of the queue their speeds reduce, and the gradient of the tracks in the graph therefore also reduce. At some point before stopping at the back of the queue 102 or slowing to a speed at which the queue is said to begin, the acoustic signal generated by most of the vehicles disappears, giving rise to an apparent termination of the tracks 100-1, 100-2 and 100-4. This is because, as the corresponding vehicle slows, the acoustic signal it generates reduces in intensity and becomes undetectable. The track 100-3, caused in this case by a slower moving and noisier vehicle, persists all the way to the back of the queue 102 and within the queue as well.

Whether the track from a particular vehicle terminates and become undetectable before arriving at the estimated position of the back of the queue 102 is reached will depend on a variety of factors such as the nature of the road surface, the amount of engine noise generated by the vehicle, the weight and size of the vehicle, and the speed of movement within the queue.

Although the back of the queue 102 may be defined or estimated in various ways as discussed further below, in FIG. 3 the point at which each vehicle is deemed to reach the back of the queue is marked by a corresponding X symbol. It can be seen that the back of the queue 102 in FIG. 3 then follows a trajectory which moves backwards along the roadway, albeit at a slow speed as indicated by the shallow gradient of the broken line.

Once inside the traffic queue, many of the vehicles may be moving too slowly to generate a visible track in FIG. 3, and may be essentially undetectable within the acoustic signal 40, or at best marginally detectable above other acoustic sources such as vibrations from other nearby roadways and more general noise. However, at some point each vehicle within the queue will start to move or move more quickly when it is at the front boundary of the queue 104, an estimated position of which is also indicated in the figure by a broken line. For some of the vehicles of FIG. 3, no new track 106 becomes visible until some time after leaving the front of the queue when the vehicle reaches a sufficient speed to give rise to a visible track, but the point at which each vehicle is deemed to depart from the front of the queue is marked by a corresponding O symbol. The track for each vehicle then increases in gradient in the graph as the vehicle speeds up. It can be seen that the front of the queue in FIG. 3 then follows a trajectory which moves backwards along the roadway.

In the example of FIG. 3, it can also be seen that the length of the queue is diminishing over time, as vehicles leave the front of the queue more quickly than they arrive at the back of the queue. Such a queue dynamic may be typical of queue behaviour on a freeway or motorway in heavy traffic, in which queues spontaneously form, lengthen, then perhaps shrink and disappear, or perhaps stay of substantially the same length but retreat backwards along the roadway. However, many other different causes and dynamics of traffic queues may be seen in the sensed acoustic data, for example traffic queues forming at junctions or traffic lights, traffic queues forming along up-ramps onto and down-ramps off freeways of motorways, and traffic queues forming in response to broken down or stranded vehicles. Each such type of queue may exhibit different dynamics in terms of positions or trajectories of the back and front boundaries of the queue and other characteristics which can be determined from the acoustic signal.

It can be seen from FIG. 3 that the signal 40 representing acoustic vibration caused by traffic along roadway segments can be used by the traffic monitor 20 of FIG. 1 to determine a variety of different second properties of the traffic. Given that each track in FIG. 3 corresponds to a different vehicle (albeit with some uncertainty about which vehicle entering the queue corresponds to which vehicle leaving the queue), traffic flow parameters such as a count or density vehicles within a particular segment of the roadway can be determined by detecting or counting the approximate or exact number of tracks within a particular range of distances at a particular time or range of times. Similarly, flow rate of the traffic can be determined from the number of vehicle tracks passing a particular spatial position or range of spatial positions within a certain time period. Velocity of the traffic flow may be determined as an average gradient of the vehicle tracks in the time-distance graph or in other ways.

Although in FIG. 3 the tracks of individual vehicles can be easily seen and separated using suitable track following algorithms, this may not always be the case. Whether the tracks are easily separated in this way or not, in some embodiments it may be preferable to determine composite movement data for the traffic within the segment using suitable filtering or other processing of the acoustic signal.

As can also be seen from FIG. 3, the acoustic signal 40 can also be used by the traffic monitor 20 to determine a variety of properties of particular or individual vehicles, by detecting the tracks of such vehicles, including spatial position and velocity. Since the distributed acoustic sensor 32 can be arranged to provide an acoustic signal with a spatial resolution of as low as or lower than 1 metre if required, such second properties can be determined with a spatial resolution of better than 10 metres, better than 5 metres, or of the order of or better than 1 metre if needed.

Second properties relating to queues of traffic can also be determined from an acoustic signal 40 such as that of FIG. 3, for example the presence of a queue can be determined from the break in multiple vehicle tracks seen in FIG. 3 between the back 102 and front 104 of the queue, and the spatial positions of front and/or back boundaries of such a queue, or of the queue as a whole, or of the length of the queue can be determined in a similar manner, as can the time expected to be taken by a vehicle to traverse the queue from the back to the front.

Tracks of individual vehicles within the acoustic signal 40 may be detected using Kalman filters or similar techniques which are well known in the art, taking benefit from using principles of conservation of momentum and limits on acceleration, or other expected track behaviour, to make this process more effective and reliable. See for example Anton Haug, "*Bayesian Estimation and Tracking, A Practical Guide*", Wiley, 2012.

As discussed above, the traffic monitor 20 of FIG. 1 is arranged to receive both first properties of vehicles of the subset of vehicles, arising from radio navigation receivers 12 in those vehicles, and to generate second properties of traffic in the subset of roadway segments from acoustic vibration signals 40, and to combine the first properties and second properties to estimate one or more third properties of the traffic, which may be output by the traffic monitor 20 as data M for further use as variously described below, or used within the traffic monitor 20 for example to generate traffic control signals, route guidance or other data for use by satnav devices in the vehicles, or for other purposes.

Because the first properties provide information about vehicles and/or traffic which has different benefits and constraints to the information provided by the second properties about vehicles and/or traffic, combining the first and second properties can yield third properties which are not possible or practical to obtain using either the first or second properties separately and alone.

For example, the first properties received from radio navigation receivers 12 relate to only a subset of vehicles at any given location or road network segment, and may be limited in frequency of reporting and/or in terms of spatial precision as discussed above. In contrast, the second properties can relate to all vehicles detected using distributed acoustic sensing at a subset of road segments, and can be provided at relatively higher frequency of reporting and/or spatial precision.

Some examples of third properties which may be estimated by combining the first properties and the second properties include all of the different first and second properties already mentioned above, for example including traffic flow parameters such as counts or densities of vehicles in the traffic in each of one or more particular segments, flow rates or velocities of the traffic in each of one or more particular segments, properties of traffic queues such as start and endpoints and lengths, as well as more derived properties such as estimated journey times across the road network, optimised vehicle routes across the road network, and so on.

Some other examples of third properties which may be estimated are more accurate or more complete traced routes of particular vehicles, where such a route could be within the subset of segments (where the second properties can be used to improve detail of the route) or both within and outside of the subset of segments.

Third properties estimated using both first and second properties as discussed herein can be used for various purposes such as improving route guidance to individual vehicles, improving traffic signal control, and providing more detailed information about driver behaviour in the context of the particular road network. Such information could help identify sections of road that are more dangerous and need special safety measures, or to coach a driver to drive more efficiently for example to reduce fuel consumption.

One particular example of a third property which can be estimated by combining the first properties and the second properties is an estimate or measure of the proportion of vehicles 8 in a particular road network segment 30 which are also within the subset of vehicles providing radio navigation receiver data. In the prior art, this estimate of a proportion of vehicles might be presumed to be a fixed ratio in the prior art, for example 50%, but in practice may vary widely in space and time. With a better estimate of this proportion, other third properties estimated from the first properties, such as traffic flow parameters or traffic guidance, can be compensated to better account for the true volume of traffic in particular segments 30. Moreover, having estimated this proportion of vehicles for segments with the subset of segments for which acoustic signals 40 are available, the same proportion, or similar proportions of vehicles extrapolated or estimated using this data, can be used in segments outside the subset of segments.

Figure 4:
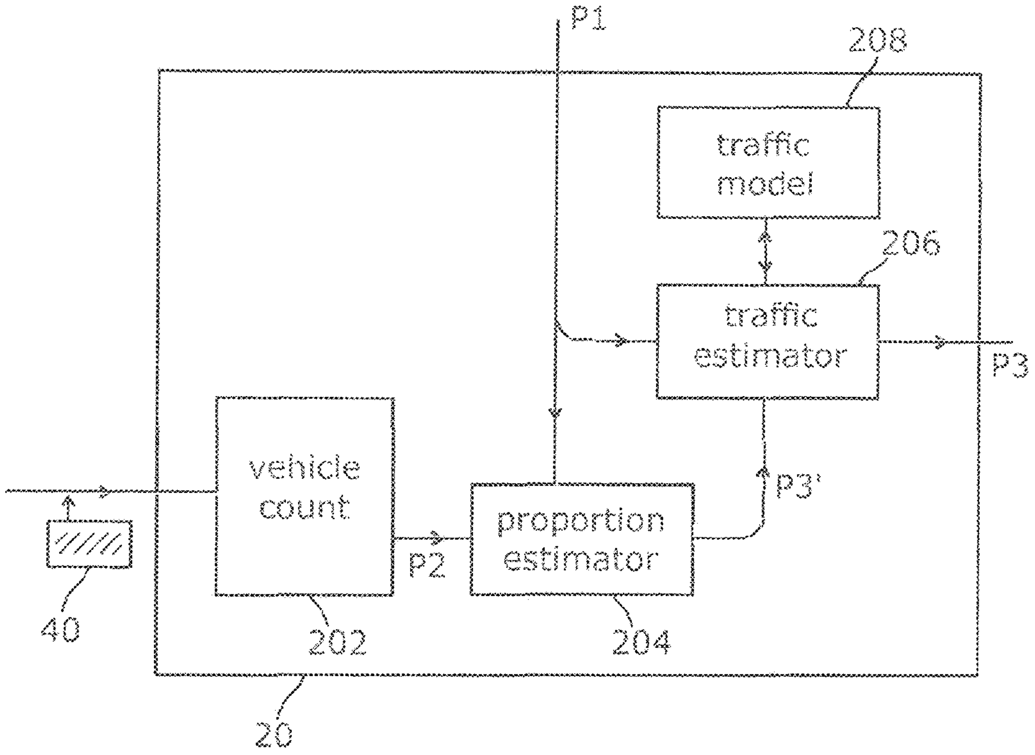
FIG. 4 shows how the traffic monitor of FIG. 1 may be implemented to estimate and use a proportion of vehicles from which radio navigation data is received out of all the vehicles present in one or more road segments.

FIG. 4 illustrates how such a proportion of vehicles may be estimated and used. The traffic monitor 20 receives both acoustic signals 40 from the one or more interrogators 34 of FIGS. 1 and 2, and first properties P1 from vehicles with radio navigation receivers 12 as described above. A vehicle count element 202 of the traffic monitor 20 analyses the acoustic signals 40 (for example as illustrated in FIG. 3 and discussed above) to estimate a count or density of traffic in one or more segments 30 of the road network. These estimates are then provided, as second properties P2 to a proportion estimator element 204 of the traffic monitor 20 which also receives the first properties P1 from which the number of vehicles in the subset of vehicles also within the same one or more segments of the road network are known. Therefore, by combining these first and second properties P1, P2, a third property P3' which is the proportion of vehicles in a particular segment which are also within the subset of vehicles providing radio navigation receiver data can be derived.

In FIG. 4 the proportion of vehicles P3' is passed to a traffic estimator element 206 of the traffic monitor 20, which estimates one or more further third properties P3 from the first properties, with these further third properties P3 being compensated for the above proportion of vehicles. In providing the further third properties the traffic estimator element 206 may use a traffic model 208.

For example, by using the proportion of vehicles provided as P3', the traffic estimator element 206 may provide as output P3 improved estimates of traffic flow parameters such as counts or densities, flow rates or velocities, of vehicles or traffic both within, and by use of the traffic model 208 outside of, the subset of segments. Other further third properties P3, compensated for the above proportion of vehicles, could be for example estimated journey times across the road network, or optimised vehicle routes across the network, either of which may be calculated using the traffic model 208.

The first properties P1 received from the radio navigation receivers 12 will not usually contain any indication of the type of vehicle carrying the receiver. However, since the second properties determined from the acoustic signals can include classifications (such as types or sizes) of individual vehicles, such second properties can be used to provide third properties which are an indication of the classifications of individual vehicles in one or more corresponding vehicles subsets. This can be achieved by identifying a classification of each of multiple vehicles in a vehicles subset using an acoustic signal which is collocated with each such vehicle, and therefore presumed to represent the same vehicle.

Such information can then be used to estimate a proportion of vehicles in the vehicles subset, especially for one or more segments of the segments subset, which fall into each of two or more particular vehicle categories. For example, it may be determined that 20% of a vehicles subset is lorries and 80% is cars. Similarly, such information can be used to estimate what proportion of vehicles in a particular vehicle category are within the vehicle subset, especially for one or more of the segments of the segments subset. For example, it may be determined that first properties are being received from the radio navigation receivers of 80% of lorries, but from only 60% of cars. The estimates have implications for estimating the number of vehicles in a traffic queue (for example given that lorries occupy more space than cars), the mix of vehicle types in a queue or affected by a traffic incident, and estimates of traffic emissions and fuel consumption.

Note that instead of explicitly using vehicle count element 202 and proportion estimator element 204 to calculate the above proportion of vehicles for use by the traffic estimator 206, other or different second properties P2 of the traffic within the subset of segments may be provided to and used by the traffic estimator 206. For example, other second properties P2 which could be determined from the acoustic signals 40 and provided to the traffic estimator 206 for similar combination with first properties could comprise one or more of the other second properties variously discussed above, and especially such second properties which are difficult to determine from the first properties, such as properties of traffic queues discussed above, or second properties with higher time and/or spatial resolution than similar or related first properties obtained using the radio navigation receivers 12.

Figure 5:
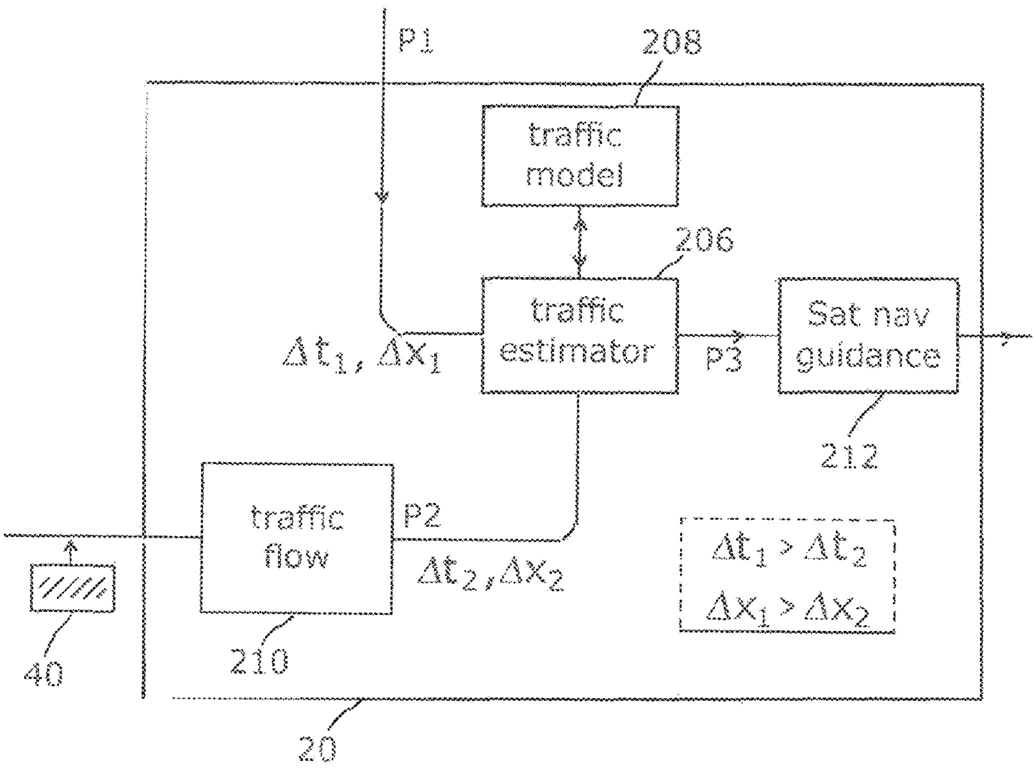
FIG. 5 shows how the traffic monitor of FIG. 1 may be implemented to improve the spatial and/or temporal resolution of traffic properties using the acoustic signals from the distributed acoustic sensing.

One such variant of the arrangement of FIG. 4 is depicted in FIG. 5, in which the acoustic signal 40 arriving at the traffic monitor 20 is provided to a traffic flow element 210 which uses the acoustic signal to determine one or more traffic flow parameters of traffic within segments of the subset of segments. These traffic flow parameters may for example comprise a count or density of vehicles in the traffic in each of one or more particular road network segments, and/or a flow rate or velocity of the traffic in each of one or more particular segments. The traffic flow parameters are then passed to the traffic estimator element 206 as second parameters P2.

As in FIG. 4, the traffic estimator 206 of FIG. 5 also receives first properties P1 from vehicles with radio navigation receivers, and uses the first properties P1 to estimate various third parameters P3. However, because the second parameters P2 may have one or both of a higher time resolution $\Delta t_2$ and/or higher spatial resolution $\Delta x_2$ than the corresponding resolutions of the first parameters $\Delta t_1$, $\Delta x_2$ such that $\Delta t_2 < \Delta t_1$ and/or $\Delta x_2 < \Delta x_1$, the traffic estimator 206 is able to use the second properties to increase the time and/or spatial resolution of the output third properties P3, at least in road segments where the second properties are available. Note that here, Δt represents a time interval and Δt represents a spatial interval, so that smaller values of these parameters correspond to higher time and spatial resolutions.

For example, since the time resolution $\Delta t_2 <$of the acoustic signal 40 and/or the second parameters may be as low or lower than a few seconds, while the radio navigation receiver data may have a time resolution $\Delta t_2$ of tens of seconds, the traffic estimator 206 is able to detect changes in traffic flow parameters at better time resolution than possible with the first parameters alone, for example up to a maximum time resolution which is the same as that of the second parameters $\Delta t_2$.

In some such embodiments, it may be desirable to determine with improved spatial accuracy or resolution, a third property which is a localised route of a particular vehicle, for example such a localised route as the particular vehicle approaches and/or traverses and/or leaves a junction between different roadways of the road network. In such as case, the higher spatial resolution of the acoustic signals 40 can be used to improve the spatial resolution of a vehicle route otherwise estimated from the first properties. In particular, the first properties are unlikely to have sufficient spatial resolution to determine with a reasonable level of certainty which lane of a roadway a particular vehicle is driving in, for example whether the vehicle is in a slip road leaving the roadway, or in a lane continuing along the roadway.

In such cases a third property may be a localised route of a particular vehicle determined with increased certainty using the first properties, for example an improved accuracy estimate of the particular lane within which the vehicle is travelling. The improved localised route may for example be provided to a satellite navigation or similar device in the particular vehicle so as to enable more appropriate route guidance to be given to a driver of that vehicle. Examples are of providing such guidance on the basis of the localised route defining whether the vehicle has passed a stop line or traffic light and continued further in a particular direction, or if that future direction is yet to be definitely decided. To this end, FIG. 5 also indicates that the third parameters P3 of improved spatial and/or temporal resolution may be provided to a satellite navigation guidance element 212 of the traffic monitor 20 or some other system which is operable to use such third parameters to provide improved route guidance to drivers in particular vehicles, or at least to provide data to particular vehicles where that data can then be used to provide such improved route guidance.

Typically, in making such improved time or spatial resolution estimates of third parameters P3, the traffic estimator 206 may make use of traffic model 208, for example to calculate improved estimates of third parameters such as concurrent traffic flow parameters, estimated journey times across the road network, or optimised vehicle routes across the road network. For example, improved resolution and accuracy of parameters of traffic flow in each of many road segments 30 can combine to considerably improve the accuracy of journey time estimates and consequently also the optimisation of recommended routes.

In the arrangements of FIGS. 4 and 5 the emphasis is on deriving third parameters P3 of the traffic which are based on the first parameters P1 from the radio navigation receivers 12, but improved in accuracy or resolution by, or compensated using, second parameters P2 determined from the acoustic signals 40. However, the traffic monitor 20 may equally estimate third parameters of the traffic P3 which are based on the second parameters P2 determined from the acoustic signals 40, but improved in accuracy or resolution by, or compensated using, first parameters P1 from the radio navigation receivers 12, or the third properties could be estimated using both first and second properties in largely equal measure.

Figure 6:
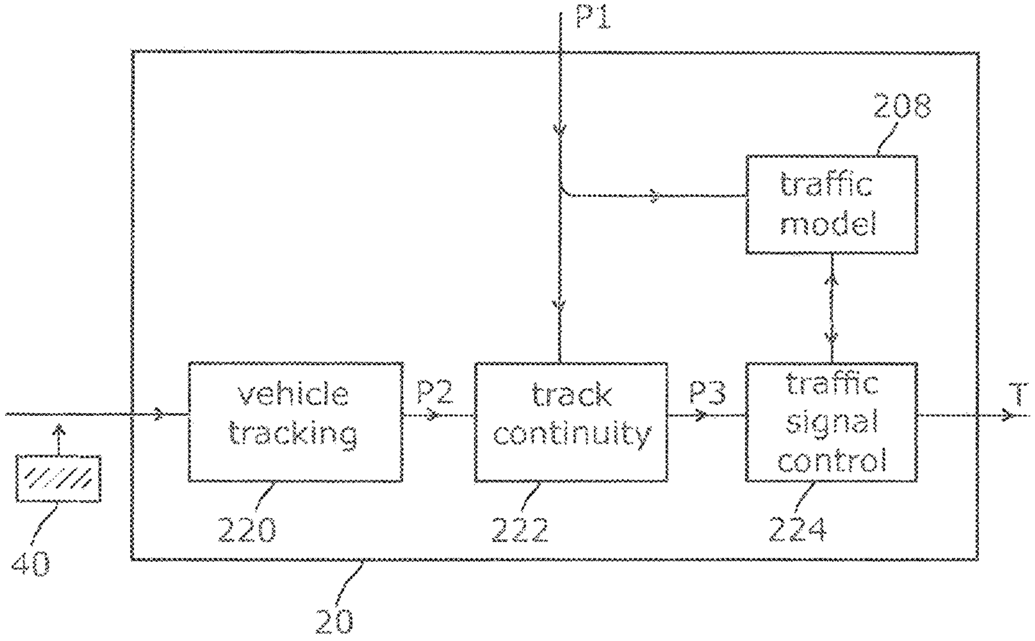
FIG. 6 shows how radio navigation receiver data may be used to improve the continuity of vehicle tracks determined using the distributed acoustic sensing data.

FIG. 6 illustrates one way in which the second properties P2 from the acoustic signals 40 can be used by the traffic monitor 20 to estimate third properties P3, with first properties from the radio navigation receivers 12 being used to improve or compensate the third properties.

In particular, the traffic monitor 20 of FIG. 6 comprises a vehicle tracking element 220 which receives the acoustic signals 40 and generates second properties P2 which represent track segments of particular vehicles, for example as visible in FIG. 3 and as already discussed above. However, as can be seen from FIG. 3, track segments of particular vehicles tend to disappear from the acoustic signal 40 when the vehicles slow sufficiently or stop. Even where continuous, segments of the track of one vehicle may become confused with segments of tracks of other vehicles, and when passing from a road segment monitored by one sensing optical fibre to a road segment monitored by another sensing optical fibre, further ambiguity may occur. As a result, in many circumstances it may be difficult to discern reliably that a first track segment belongs to the same vehicle as a later, second track segment.

To this end, the traffic monitor of FIG. 6 comprises a track continuity element 222 which receives first properties P1 from the radio navigation receiver 12 of a particular vehicle, from which disparate segments of the track of that vehicle in the acoustic signals 40 can be correctly attributed to the same vehicle. The output of the track continuity element 222 is then third properties P3 which define one or more extended tracks where all the segments of each extended track are known to belong to a particular vehicle. Such an extended track may extend across multiple ambiguities and loss of track signal in the acoustic signals 40. Such an extended track may also traverse multiple roadway segments 30 served by different sensing optical fibres 36, and may even traverse roadway segments not served by any sensing optical fibre, whether that is a short roadway segment at a junction, or a more extended length segment of roadway running some distance from any sensing optical fibre.

The extended tracks may be further used by the traffic monitor 20 in various ways. In FIG. 6 the extended tracks P3 are passed to a traffic signal control element 224, which may use a traffic model 208 to calculate optimal traffic signalling T to output for control of traffic signals, for example to improve traffic flow and perhaps reduce pollution and other benefits. In this case, the extended tracks may serve to inform the traffic signal control of current and therefore expected traffic flow across a particular junction, or across multiple junctions and extended parts of the road network, so that the traffic signal control element 224 can optimise the traffic signalling accordingly.

However, the extended tracks provided as third properties P3 could be used in various other ways. For example, an extended track may indication that, in a section of roadway that lies between segments monitored using distributed acoustic sensing, the traffic flow or velocity slows considerable, indicating some kind of queue or incident. The time delay between the acoustically monitored segments can then be taken into account for the purposes of route optimisation, traffic control (for example to optimise driving efficiency, emissions and fuel consumption), and so on.

In the described arrangements, a number of functional elements have been described which carry out data processing activities, such as the analyser 68, the traffic monitor 20, and particular components of the traffic monitor 20 such as the vehicle count element 202, the proportion estimator 204, the traffic estimator 206, the traffic model 208, the traffic flow element 10, the vehicle tracking element 220, the track continuity element 222, and the traffic signal control element 224.

Although illustrated as being located in particular physical and/or logical relationships to each other and other aspects of the embodiments, computer implemented functionality of such elements can of course be located and distributed in various ways for example in or between various computer systems and in various locations, with such computer systems being suitably linked using data network connections and the like.

Such computer systems will typically comprise one or more suitable microprocessors, associated memory, suitable data input and output facilities, network connections and so forth. Where methods relating to data analysis are described herein, these will typically be implemented using computer program software executing on such computer systems, and the invention extends to such computer programs comprising software instructions, as well as to one or more computer readable media carrying such computer programs.

Although specific embodiments of the invention have been described with reference to the drawings, the skilled person will be aware that variations and modifications may be applied to these embodiments without departing from the scope of the invention defined in the claims.

For example although determination of first, second and third properties of traffic queues and vehicle properties using distributed acoustic sensing and data from radio navigation receivers in particular have been described, the data derived from such sensing modes may be combined with that from other data sources to further enhance determination of properties of traffic and particular vehicles, control road traffic signals, provide route guidance to drivers, and for other purposes. For example, such other data sources may include road traffic cameras, radar systems, Bluetooth sensors, induction loops, magnetometers and other road surface embedded detectors, data streams received from position tracking systems within the vehicles themselves, and so forth.

Although the sensing of acoustic vibration caused by the traffic is referred to, this could also or instead be referred to simply as vibration, noise, disturbances, physical disturbances, or in other similar terms.

The invention claimed is:

1. A method of estimating one or more properties of traffic passing along roadway segments of a road network, the traffic comprising a plurality of vehicles, the method comprising:

receiving, from a radio navigation receiver located at each vehicle of a subset of said vehicles, first properties of each of the vehicles in the subset of vehicles;

using a distributed acoustic sensor to generate, as a function of time and of position along the roadway segments of the road network, acoustic signals representing acoustic vibration caused by said traffic at one or more sensing optical fibers that extend along the roadway segments;

using the acoustic signals representing acoustic vibration caused by said traffic to determine second properties of said traffic in the roadway segments of the road network, the second properties of the traffic including vehicle tracks, each vehicle track corresponding to one vehicle traversing the road network, wherein the vehicle tracks include non-continuous track segments; and combining the first properties of the vehicles in the subset of vehicles with the second properties of the traffic to generate third properties of the traffic that are used to provide navigation services in the road network, wherein combining the first properties of the vehicles with the second properties of the traffic to generate the third properties of the traffic comprises:

utilizing the first properties received from the radio navigation receiver of each particular vehicle in the subset of vehicles to determine which track segments of the non-continuous track segments belong to the particular vehicle, correcting the non-continuous track segments by connecting the track segments belonged to each particular vehicle together, and generating the third properties of the traffic including extended tracks of the vehicles traversing the road network, wherein each extended track shows a continuous track of one of the vehicles traversing the road network.

2. The method of claim 1, wherein the first properties of each of the vehicles in the subset of vehicles comprise one or more of: a position of the vehicle; a velocity of the vehicle; and a direction of travel of the vehicle.

3. The method of claim 1, wherein the first properties of each of the vehicles in the subset of vehicles are sent by, or received from, each vehicle no more than every 10 seconds.

4. The method of claim 3, wherein the second properties of the traffic in the roadway segments are determined more frequently than every 10 seconds.

5. The method of claim 1, wherein the second properties of the traffic in the roadway segments comprise one or more of: a count or density of vehicles in the traffic; and a flow rate or velocity of the traffic.

6. The method of claim 1, wherein the second properties of the traffic in the roadway segments comprise one or more properties of queues of said traffic, wherein said one or more properties of the queues of said traffic comprise one or more of: a presence of a queue, spatial positions of front and back boundaries of the queue, a spatial length of the queue, and time expected for a vehicle to remain in the queue.

7. The method of claim 1, wherein the third properties of the traffic comprise one or more of: an estimate of a proportion of vehicles in the subset of vehicles from which the first properties were received; and an estimate of a proportion of vehicles in specific vehicle categories that are found in the subset of vehicles.

8. The method of claim 1, wherein the third properties of the traffic comprise one or more of: a count, density, flow rate or velocity of the vehicles in the road network; an estimated journey time across the road network; and an optimised vehicle route across the road network.

9. The method of claim 1, wherein by using the second properties of the traffic, the third properties of the traffic define a particular lane of a roadway segment in the road network within which a particular vehicle is travelling.

10. The method of claim 1, further comprising providing route guidance to a driver of a vehicle based on the third properties of the traffic estimated at a higher temporal or a higher spatial resolution than corresponding temporal and spatial resolutions of the first properties.

11. Apparatus for estimating one or more properties of traffic passing along roadway segments of a road network, the traffic comprising a plurality of vehicles, the apparatus being arranged:

to receive, from a radio navigation receiver located at each vehicle of a subset of said vehicles, first properties of each of the vehicles in the subset of vehicles;

to receive, from one or more distributed acoustic sensors each comprising one or more sensing optical fibers that extend along the roadway segments of the road network, acoustic signals representing acoustic vibration caused by said traffic as a function of time and of position along the roadway segments;

to use the acoustic signals representing acoustic vibration caused by said traffic to determine second properties of said traffic in the roadway segments of the road network, the second properties of the traffic including vehicle tracks, each vehicle track corresponding to one vehicle traversing the road network, wherein the vehicle tracks include non-continuous track segments; and to combine the first properties of the vehicles in the subset of vehicles with the second properties of the traffic in the roadway segments to generate third properties of the traffic that are used to provide navigation services in the road network, wherein, to combine the first properties of the vehicles with the second properties of the traffic to generate the third properties of the traffic, the apparatus is arranged to:

utilize the first properties received from the radio navigation receiver of each particular vehicle in the subset of vehicles to determine which track segments of the non-continuous track segments belong to the particular vehicle, correct the non-continuous track segments by connecting the track segments belonged to each particular vehicle together, and generate the third properties of the traffic including extended tracks of the vehicles traversing the road network, wherein each extended track shows a continuous track of one of the vehicles traversing the road network.

12. The apparatus of claim 11, wherein the first properties of each of the vehicles in the subset of vehicles comprise one or more of: a position of each vehicle; a velocity of each vehicle; and a direction of travel of each vehicle.

13. The apparatus of claim 11, wherein the second properties of the traffic comprise one or more of: a count or density of vehicles in the traffic; a flow rate or velocity of the traffic; positions of particular vehicles; velocities of the particular vehicles; categories or sizes of the particular vehicles; and one or more properties of queues of said traffic, and wherein the third properties of the traffic comprise one or more of: an estimate of a proportion of the vehicles of the traffic that provide the first properties of the vehicles; a count, density, flow rate or velocity of the traffic in the road network; an estimated journey time across the road network; an optimised vehicle route across the road network; and routes of the particular vehicles.

14. The apparatus of claim 11, further comprising one or more of:

a traffic signal control system arranged to receive the third properties and to provide control signals to the traffic using the third properties; and a satellite navigation service arranged to receive the third properties and to provide the navigation services to one or more vehicles within the road network using the third properties.

* * * * *